Patented Mar. 30, 1937

2,075,276

UNITED STATES PATENT OFFICE 2,075,276

PROTEIN AND UREA RESIN MOLDING COMPOSITION AND PROCESS OF MAKING SAME

Carleton Ellis, Montclair, N. J., assignor to Ellis-Foster Company, a corporation of New Jersey No Drawing. Application September 11, 1935, Serial No. 40,091

16 Claims. (Cl. 106—22)

This invention relates to molding compositions and molded products and to the process of making same and particularly to materials prepared from urea resins with substances of that class known as proteins which on hydrolysis form amino acids and which include water-soluble or water-sensitive bodies such as casein, gelatin, glue, zein, sericin and albumin, and water-insoluble bodies comprising collagens, fibroids, keratoids and chitinoids and exemplified by wool, silk, fur, feathers, keratin, dried blood and leather scrap.

In various copending applications I have described the use of protein materials with urea-formaldehyde condensation products to form hot-molding compositions. For example, in Serial No. 689,165, filed Jan. 28, 1924, entitled "White synthetic resin and process of making same," I have disclosed and claimed shaped articles containing the reaction product of urea and formaldehyde, and an acid. Casein and gelatin are set forth therein as modifying or tempering agents and other specific ingredients of the composition include silk flock and leather scrap. Further, in Serial No. 694,420, filed Feb. 21, 1924, entitled "White plastic resin and process of making same," wherein is disclosed and claimed molded articles comprising heat-set urea-formaldehyde resin containing an acid catalyst, the use of wool flock, silk flock and ground or comminuted leather scrap is described.

It is an object of this invention to prepare hot-molding compositions which can be molded to form articles having improved translucency, strength, flexibility, and also, in many cases, lower cost than when cellulose is used as the reinforcing agent for the molded article.

Another object is to provide compositions which can be hot-molded to form translucent articles of the nature of threaded bottle caps which when hot (freshly formed) are flexible enough to be sprung off the threaded projection of the mold rather than unscrewed.

It is a further object to prepare homogeneous molded articles from urea resin and proteins.

Protein materials and urea-formaldehyde condensation products are nitrogenous. Rather surprisingly it has been found that urea resin evinces a pronounced affinity for the water-insoluble proteins. The affinity between a water-insoluble protein such as hair and a urea-formaldehyde condensation product can be shown by mixing the two substances and hot-pressing, whereby a homogeneous article is obtained. On the other hand, when urea-formaldehyde is replaced by a phenol-formaldehyde resin (non-nitrogenous) and hot-pressed, an entirely different result is obtained. The article has little strength and the hair is readily distinguishable since there is no cementing of resin and fiber. For present purposes it is immaterial whether the difference between urea-formaldehyde and phenol-formaldehyde in this respect is due to actual combination with the fiber in the case of urea-formaldehyde or to differences in adhesion of the two resins to the water-insoluble protein. The results are entirely different.

Besides being nitrogenous and hydrolyzable to amino acids, proteins are reactive with formaldehyde. They may therefore be reacted with formaldehyde before incorporation with the urea resin composition or they may be used in their normal form, in which case during drying or molding they tend to react with any formaldehyde which is released by the curing of the methylol compounds, thereby reducing blistering of the molded article.

The urea resin employed is preferably that produced by reaction of urea and formaldehyde, including formalin and formaldehyde polymers, paraform and so forth, or substances of equivalent behavior. In addition to urea various urea derivatives, thiourea, guanidine compounds and the like or mixtures of these may be used. Formaldehyde likewise may be replaced in whole or in part by other aldehydes including, for example, acetaldehyde.

The method of incorporating urea-formaldehyde with proteins is to mix the aqueous urea resin syrup, such as obtained by reaction of a substantially neutral aqueous solution of urea and formaldehyde, with the protein, together with cellulose filler, if desired. The mixture is dried to eliminate water, drying being done at low enough temperature that the urea resin is retained in a form in which it can be readily molded. After drying, the mixture of protein and urea resin is ground to a powder in a ball mill or otherwise, and a catalyst to facilitate curing (e. g., glycerol dichlorohydrin) and a mold lubricant (zinc or aluminum stearate, petrolatum etc.), as well as pigments and dyes, are added at some stage during the grinding.

If desired, the protein material may be introduced into the initial mixture of urea and formalin, thereby securing the advantage of co-resinification between formaldehyde, urea and protein.

The following examples illustrate various ways of carrying out this invention. Parts are by weight.

A urea resin syrup was prepared by refluxing together for 1 hour and 30 minutes 1120 parts of 37% aqueous formaldehyde (pH 7.0), 0.5 part of magnesium carbonate and 552 parts of urea. The pH of the mixture was kept at 7.0 during the first few minutes of boiling by adding occasional drops of sodium hydroxide. This water-white solution was used with various proteins and will be referred to hereinafter as the resin syrup. Although the above represents the preferred composition and method of making the urea resin, the proportions and conditions can be varied depending upon specific requirements.

Example 1

200 parts resin syrup and 62 parts silk fabric (which had been previously washed and shredded) were dried at 70° C., ground, and screened. With every 100 g. of composition thus obtained there was incorporated 1 cc. glycerol dichlorhydrin and 0.25 g. zinc stearate by grinding the mixture in a ball mill.

The final composition was molded in a cup die at 140° C., 3500 lb. per sq. in., for 5 minutes. The moldings were light brown, quite translucent, and had a fair glaze. The material had a soft flow.

Example 2

200 parts resin syrup and 28 parts wool yarn (pH=5.5) were air dried for 48 hours, then at 70° C. for 3 hours. The dried material was ground in a ball mill after which 1 cc. glycerol dichlorhydrin and 0.25 g. zinc stearate per 100 g. composition were added.

When molded at 140° C., 3500 lb. per sq. in., for 5 minutes, the flow was good, the color white, the translucency fair, glaze good, and strength excellent. When a molding was boiled in water for 15 minutes, the gloss was very slightly reduced but it was otherwise unaffected.

Example 3

Leather scrap was washed several times with water, dilute sodium carbonate, and again with water. The pH was then 6.5. The scrap (70 parts) was then mixed with 200 parts resin syrup and allowed to air-dry for 48 hours after which drying was continued at 70° C. for 3 hours. Grinding to a fine powder was done in a ball mill and in the final stage of grinding curing catalyst and mold lubricant were added in the proportions shown in Example 2.

The powder when molded at 125° C. and at 140° C. proved to have considerably harder flow than when wool or silk was used. The color of the resulting molding was dark brown.

Example 4

200 parts resin syrup and 100 parts casein were mixed, dried, ground, activated and lubricated as in Example 2. The material when molded at 140° C., 3500 lb. per sq. in., for 5 minutes was rather hard flowing and gave moldings of a light grayish color, opaque, and not very well glazed.

Example 5

70 parts casein were digested with 200 parts of cold 37% formaldehyde and 200 parts of water. The washed and filtered product was incorporated with 200 parts resin syrup, dried at 70° C., ground, and activated and lubricated as in Example 2. The material was molded in a cup die at 140° C. for 5 minutes, and at 160° C. for 3 minutes, at 3500 lb. per sq. in. The flow was greatly improved over that of the composition of Example 4. Well-formed, light gray, quite translucent, strong cups were obtained.

Example 6

200 parts resin syrup and 60 parts glue were treated as in Example 2. When molded at 140° C., 3500 lb. per sq. in., for 5 minutes, the composition was found to be somewhat hard flowing. The cups produced were rather dark colored and quite translucent.

Example 7

200 parts resin syrup and 70 parts dried egg albumin were treated as in Example 2. When molded at 125° C. and at 140° C., 3500 lb. per sq. in. for 5 minutes the composition was soft flowing. Well formed moldings were produced which had a slightly satiny glaze and high translucency, it being possible to read through sections 1 mm. in thickness if held on a printed page. The moldings were very brittle, however, and required the addition of fibrous material to impart strength.

Example 8

200 parts resin syrup and 70 parts powdered milk were mixed and dried at 70° C. The mix would not grind in a ball mill, however, because the butter fat acted as a lubricant. Hence the material was coarsely ground in a food chopper and molded at 140° C., 3500 lb. per sq. in., for 5 minutes. The material was hard flowing and the particles did not flow together well. The moldings were non-homogeneous and had the appearance of gray granite. Compositions of this nature are therefore suggested for making articles which simulate granite.

Example 9

200 parts resin syrup and 50 parts zein were treated as in Example 2.

When molded at 140° C., 3500 lb. per sq. in., for 5 minutes the powder was found to be soft flowing. The molded article thus produced was nicely formed, highly glazed, quite translucent, flexible when hot, and of an olive-green color.

When molded as above for 13 minutes the appearance was unchanged and the cup was less affected by prolonged boiling in water.

Example 10

62 parts dark-colored hair were washed with water and isopropyl alcohol, dried, and mixed with 200 parts resin syrup. The mix was dried at 70° C. and treated as in Example 2.

When molded at 140° C., 3500 lb. per sq. in., for 5 and 8 minutes, the flow was soft, well-formed, black, strong moldings being obtained.

Example 11

Equal parts of molding compositions described in Examples 1 and 2 were thoroughly mixed and molded at 140° C., 3500 lb. per sq. in., for 5 minutes. The moldings thus produced were nicely formed and strong. The translucency was about the same as that of the moldings of Example 1.

Example 12

Equal parts of molding compositions of Examples 2 and 7 were thoroughly mixed and molded as in Example 11. The articles were light colored, strong and translucent.

All the above compositions gave molded articles which were mechanically strong when cold. When taken hot from the mold all possessed a degree of flexibility (thermoelasticity) and had sufficient elasticity so that on deformation the tendency was to spring back into the original shape. This property is important in enabling articles to be removed from the mold with less danger of breakage than with compositions which on coming from the mold are more brittle, such as molded articles containing cellulose filler. Also, as noted above, this property enables molding in stripping dies to give rapid production of threaded articles. Cellulose filler can be added to the compositions, the amount of cellulose utilized being insufficient to counteract the thermoelasticity imparted by the protein material.

Although the above compositions are described in relation to hot-molding in closed dies, they are also adapted to extrusion molding on account of their relatively easy flow.

What I claim is:

1. A urea-aldehyde resin molding composition comprising urea-aldehyde resin and a protein substance.

2. A urea-formaldehyde resin composition comprising urea-formaldehyde resin and a protein substance, said composition being capable on hot-molding of yielding strong, translucent articles possessing thermoelasticity.

3. A urea-aldehyde resin composition comprising urea-aldehyde resin and a water-insoluble protein substance, said composition being capable on hot-molding of yielding strong translucent articles possessing thermoelasticity.

4. A urea-aldehyde resin molding composition comprising urea-aldehyde resin and a water-insoluble protein substance selected from the group consisting of collagens, fibroids, keratoids, and chitinoids.

5. A urea-aldehyde resin molding composition comprising urea-aldehyde resin, a protein substance and a cellulose filler.

6. Process of making a molding composition which comprises incorporating a urea-aldehyde resin syrup with a protein substance and drying the mixture.

7. Process of making a molding composition which comprises incorporating a urea-formaldehyde resin syrup with a protein substance and drying the mixture.

8. Process of making a molding composition which comprises incorporating a urea-aldehyde resin syrup with a water insoluble protein substance selected from the group consisting of collagens, fibroids, keratoids and chitinoids and drying the mixture.

9. A molding composition obtainable by the process of claim 6.

10. A molding composition of the type obtainable by the process of claim 7.

11. A molding composition of the type obtainable by the process of claim 8.

12. A urea-aldehyde resin molding composition comprising a glycerol halo-hydrine and the product obtained by incorporating urea-aldehyde resin syrup with a protein substance and drying the resulting mixture.

13. A molding composition according to claim 12, in which the glycerol halo-hydrine is glycerol dichlorhydrine and the protein substance is zein.

14. Process of forming urea-aldehyde resin article which comprises subjecting the mixture obtained by incorporating a urea-aldehyde resin syrup with a protein substance and drying the mixture to a hot pressing operation.

15. Process as defined in claim 14 wherein the protein substance is a water-insoluble protein substance and the hot pressing operation is carried out until substantial disappearance of the protein substance.

16. The process as defined in claim 14 wherein the mixture subjected to the hot pressing operation contains glycerol dichlorhydrine.

CARLETON ELLIS.